Jan. 5, 1937. F. G. KRAFT Re. 20,229

SPINDLE

Original Filed Oct. 26, 1933 2 Sheets-Sheet 1

F. G. Kraft INVENTOR.

BY

John L. Seymour ATTORNEY.

Jan. 5, 1937. F. G. KRAFT Re. 20,229

SPINDLE

Original Filed Oct. 26, 1933 2 Sheets-Sheet 2

F. G. Kraft INVENTOR.

BY

John L. Seymour ATTORNEY.

Reissued Jan. 5, 1937 Re. 20,229

UNITED STATES PATENT OFFICE 20,229

SPINDLE

Frederick G. Kraft, Richmond, Va., assignor, by mesne assignments, to E. I. du Pont de Nemours & Company, Wilmington, Del., a corporation of Delaware Original No. 1,972,150, dated September 4, 1934, Serial No. 695,286, October 26, 1933. Application for reissue July 18, 1936, Serial No. 91,435

8 Claims. (Cl. 18—8)

Figure 1:
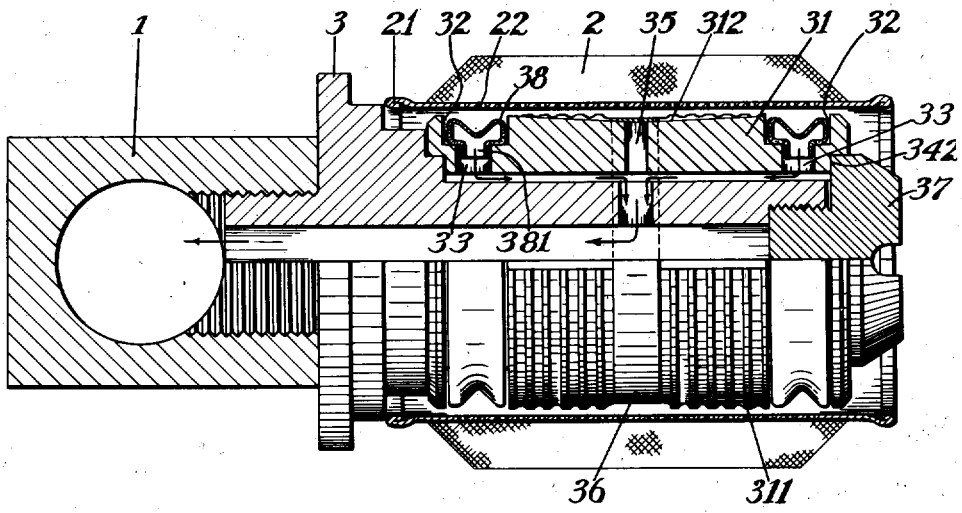

This invention relates to the fluid treatment of materials. The invention also relates to sealing means. More specifically the invention relates to the treatment of thread by liquids under pressure. The invention particularly relates to an apparatus for treating rayon thread wound on bobbins with fluids under pressure and has specific embodiment in a bobbin and cooperating spindle having a sealing means operated by fluid pressure. The invention will be described with particular relation to the fluid treatment used in the manufacture of rayon, but it is to be understood that it has equal applicability to the fluid treatment of bobbin-carried thread of any kind.

In the manufacture of rayon by one process the newly coagulated thread is carried on bobbins. It is considered desirable to treat these packages without removing the thread in order to avoid damaging the thread. This is accomplished by treating the thread with fluids under pressure while on the bobbin.

In the pressure treatment of artificial silk, according to the method mentioned in paragraph 2, the silk is wound on perforated bobbins which are mounted on washing spindles by clamping or screwing compressible gaskets against the ends of the bobbins. Fluids necessary to the treatment are then forced through the spindle, the perforations of the bobbins and the thread. Difficulty is experienced when high pressure is used (that is, pressure of 40–50 pounds per square inch) by reason of leakage around, or blowing out of the gaskets; a wasteful amount of time is required to mount the bobbins on and to remove them from the spindles; the gaskets are subject to excessive wear and frequent replacements; and in cases where there is a leaking gasket, the washing must be stopped until the gasket can be replaced.

In the copending application of Paul Marie Pierrat, Serial No. 533,175, filed April 27, 1931, is disclosed one apparatus which overcomes many of the difficulties above described. Experience has shown, however, that when water is first turned on in the rack carrying the bobbins the pressure may be insufficient to expand all of the gaskets and great leakage may occur around the gaskets until pressure has been built up. As a result, during the time in which the pressure is being built up to that requisite to close all the gaskets, water may be sprayed past the gaskets all over the room. The tendency of the rubber gaskets to harden with age increases this fault of the Pierrat spindle. Furthermore, after the yarn has been treated, it is sometimes difficult to remove a particular bobbin because a washer remains expanded.

An object of this invention is to provide a method and apparatus for the fluid treatment of thread carried on carriers or bobbins. Another object of the invention is to overcome the difficulties inherent in the Pierrat device. Another object of the invention consists in the construction of a wash spindle which, by fluid pressure, seals the ends of the bobbins and, by fluid pressure, releases the bobbin when the washing is complete. A still further object of the invention consists in the manufacture of a new and improved type of washing spindle. Other objects of the invention will be in part apparent and in part described elsewhere herein.

The objects of the invention are accomplished, generally speaking, by the use of a washing apparatus having means, which are both collapsible and expansible, for sealing the ends of the bobbin.

Figure 4:
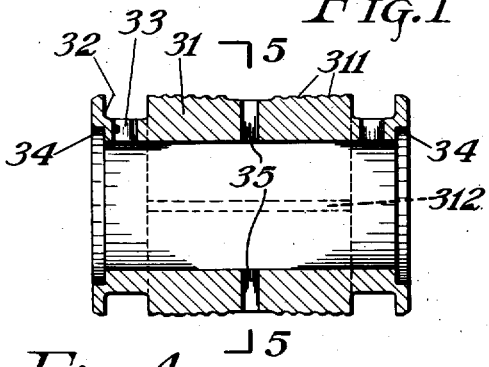
Figure 5:
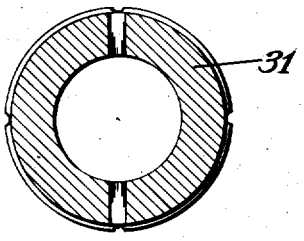
Figure 6:
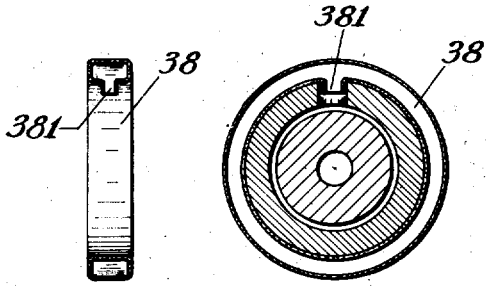
Figure 2:
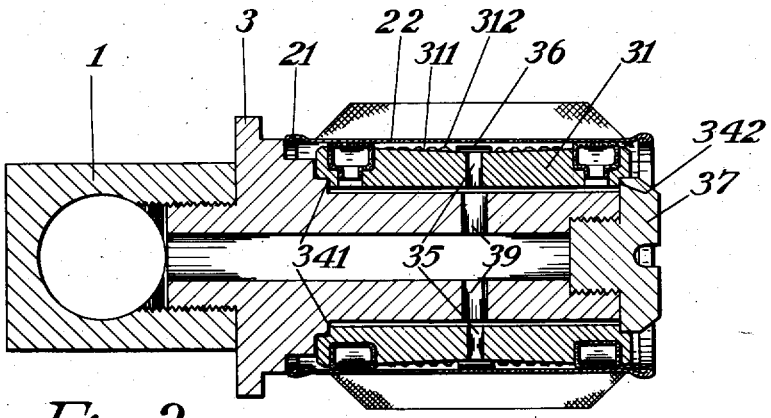
Figure 3:
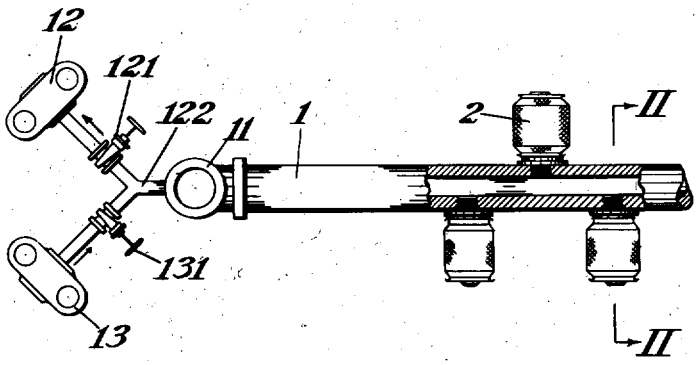

In the drawings Figure 1 is a view partly in section of a washing apparatus made in accordance with the principles of my invention. Figure 2 is a sectional view similar to Figure 1. Figure 3 is a plan view of a wash rack showing the pressure and vacuum pumps. Figure 4 is a longitudinal section through the sleeve portion of the apparatus. Figure 5 is a cross section of the sleeve portion of the apparatus. Figure 6 are views showing, in section, the sealing ring.

Referring to the numerals of the drawings, 1 is a pipe of a wash rack. In practice a number of these pipes are mounted in vertical alinement. 11 is a vertical pipe forming the end pipe of a washing rack; 12 is a vacuum pump; 13 is a pressure pump; 121 is a valve; 131 is a valve; 122 is a pipe connecting the pumps to the wash rack; 2 refers in general to a bobbin wound with thread.

When pressure less than atmospheric is wanted in the wash rack, the pump 13 is stopped, the valve 131 is closed, valve 121 is opened, and pump 12 is started. If it is desired to force a fluid into the rack, the valve 121 is closed, the vacuum pump is stopped, valve 131 is opened, and pump 13 is connected to the proper fluid and is started.

21 is a metal bobbin having perforations 22 and imperforate ends. In spinning, as is customary in this art, the thread is wound about the perforated part of the bobbin so as to overlap the imperforate ends.

3 is a wash spindle connected, as by a screw thread, to a pipe 1 of the wash rack; 31 is a sleeve fitting over the spindle; 32 are annuli near the ends of the sleeve; 33 are holes in the sleeve leading from the interior of the sleeve to the annuli;

34 are annular shoulders in the sleeve designed to fit fluid-tight against shoulders 341 of the spindle and 342 of the end piece; 35 are holes through the sleeve to permit the passage of fluid from the interior to the outside of the sleeve; 36 is a rubber band fitting, in an annular depression provided therefor, over the holes 35; 311 are grooves extending circumferentially of the sleeve; 312 are grooves extending longitudinally of the sleeve and intersecting grooves 311; 37 is an end piece for the spindle having annular shoulder 342 capable of making a fluid-tight fit with shoulder 34 of the sleeve; 38 are flexible, ring-shaped tubes; 381 are tubular projections in the tubes of a size to approximately fit the holes 33 of the sleeve. The flexible annular tubes 38 are of a diameter in their normal condition slightly greater than the interior diameter of the bobbins which are to be treated on the spindle.

The apparatus functions as follows: The wash rack is assembled in a manner which will be understood by those acquainted with the art; the spindles are mounted on the rack; the sleeves 31 are put into position on the spindles and are held by the end pieces 37; either before or after mounting the sleeves on the spindles the flexible tubes 38 are mounted in the annular depressions at the ends of the sleeves. The spindle is now in condition for operation. When all the spindles have been mounted on the rack, the air is partially exhausted within the system by turning on the suction pump; the rubber bands, which cover the holes 35 in the sleeve, act as a valve preventing the ingress of air; the flexible tubes 38 collapse, as shown in Figure 1, and the bobbins can be easily slid into place.

The vacuum pump is now stopped; the valve 121 is closed; and the valve 131 is opened. The pressure within the wash rack is now equalized and the tubes resume their normal shape. Being slightly larger than the interior diameter of the bobbin, they form a seal which prevents such fluid as may be forced into the spindle by the pump 13 from leaking past the ends of the bobbin. The pump 13 is now started and forces fluid, for instance wash water, through the pipe 122, rack 11, pipe 1, and into the interior of the spindle. The spindle is provided with holes 39 through which the fluid is forced. The sleeve 31 is somewhat larger in its interior diameter than the portion of the spindle which it covers. As a consequence, the space between the spindle and the sleeve is filled with the fluid, which passes through hole 35, forces its way past the rubber band valve, and on through the holes of the bobbin and through the rayon or other thread which is carried on the bobbin. The fluid between the spindle and the sleeve also enters the holes 33 of the sleeve and fills the interior of the flexible tubes, as shown in Figure 2, forcing them very tightly against the bobbin and forming a pressure seal which continues so long as the fluid is forced through the thread. When the treatment is finished, and the bobbin is to be withdrawn, the pressure pump is cut off from the rack, the vacuum pump is turned on, the fluid within the rack is removed, and the rings are collapsed so that the bobbin can be removed without difficulty.

Many modifications of this invention are possible. For instance, the tube may be of rubber or of any other suitable flexible material. The fluid forced through the system may be any gas or any liquid. The material treated may be thread or any other pervious material which can be held on the surface of a bobbin when there is pressure within. The method of filling and exhausting the rack is shown for illustrative purposes only. Many other systems could be substituted for it.

An advantage of the invention is that a washing apparatus is provided which seals the ends of the thread carrier before pressure is turned on from within, preventing the escape of fluid past the sealing rings. Another advantage of the invention is that the apparatus can be easily dismantled and cleaned. Another advantage of the invention is in the saving of large quantities of treating fluids, compared to the Pierrat invention heretofore disclosed. Other advantages of the invention will be in part apparent and in part elsewhere herein described.

As many apparently widely different embodiments of this invention may be made without departing from the spirit and scope thereof, it is to be understood that I do not limit myself to the specific embodiments thereof except as defined in the appended claims.

I claim:

1. In an apparatus for the fluid treatment of thread, a hollow perforated thread holder, a hollow perforated spindle to carry the thread holder, means for reducing the pressure within the spindle to be below the pressure outside the spindle, means for forcing liquid under pressure through the thread holder, and means for sealing the ends of the thread holder comprising flexible tubes of slightly greater diameter than the interior diameter of the thread holder encircling the spindle at points adjacent the thread holder ends, means connecting the interior of the tubes with the interior of the spindle whereby the tubes may be collapsed or put under interior pressure according to the pressure existing within the spindle, and a flexible rubber band covering the said perforations in the spindle to permit fluid to be forced through the thread holder but closing the perforations of the spindle when the interior of the spindle is under reduced pressure.

2. In an apparatus for the fluid treatment of thread, a hollow perforated thread holder, a hollow perforated spindle to carry the thread holder, means for reducing the pressure within the spindle below the pressure outside the spindle, means for forcing liquid under pressure through the spindle and means for sealing the ends of the thread holder comprising flexible tubes of slightly greater diameter than the interior diameter of the thread holder encircling the spindle at points adjacent the thread holder ends, means connecting the interior of the tubes with the interior of the spindle whereby the interior pressure of the spindle will tend to change the size of the tube, and flexible means covering the said perforations in the spindle.

3. In an apparatus for the fluid treatment of thread, a hollow perforated thread holder, to carry the thread holder a hollow spindle having perforations closed by a one-way valve which can be opened outwardly by pressure within the spindle, means for reducing the pressure within the spindle below the pressure outside the spindle, means for forcing the liquid under pressure to the thread holder through the spindle, and means for sealing the ends of the thread holder comprising flexible tubes encircling the spindle at points adjacent the thread holder ends, means connecting the interior of the tube to the interior of the spindle whereby the size of the tube may tend to be changed by changing the pressure in the spindle.

4. In an apparatus for the fluid treatment of thread on a perforated bobbin in which fluid is simultaneously passed through a fluid pressure expansible means for sealing the ends of said bobbin and to a conduit leading to the internal surface of said bobbin, means associated with said conduit for preventing the passage of fluid through said conduit until the said expansible means has been actuated.

5. In an apparatus for the fluid treatment of thread on a perforated bobbin in which fluid is simultaneously passed through a fluid pressure expansible means for sealing the ends of said bobbin and to a conduit leading to the internal surface of said bobbin, yieldable means associated with said conduit for preventing the passage of fluid through said conduit until the said expansible means has been actuated.

6. In an apparatus for the fluid treatment of thread on a perforated bobbin in which fluid is simultaneously passed through a fluid pressure expansible means for sealing the ends of said bobbin and to a conduit leading to the internal surface of said bobbin, a yieldable band associated with said conduit for preventing the passage of fluid through said conduit until the said expansible means has been actuated.

7. In an apparatus for the fluid treatment of thread on a perforated bobbin in which fluid is simultaneously passed through a fluid pressure expansible means for sealing the ends of said bobbin and to a conduit leading to the internal surface of said bobbin, a rubber band associated with said conduit for preventing the passage of fluid through said conduit until the said expansible means has been actuated.

8. In an apparatus for the fluid treatment of thread, a hollow perforated thread holder, a hollow perforated spindle to carry the thread holder, means for forcing liquid under pressure through the thread holder, and means for sealing the ends of the thread holder comprising flexible tubes of slightly greater diameter than the interior diameter of the thread holder encircling the spindle at points adjacent the thread holder ends, means connecting the interior of the tubes with the interior of the spindle whereby the tubes may be put under interior pressure according to the pressure existing within the spindle, and a flexible rubber band covering the said perforations in the spindle to permit fluid to be forced through the thread holder but closing the perforations of the spindle when the interior of the spindle is under reduced pressure.

FREDERICK G. KRAFT.